United States Patent
Nasserrafi et al.

(10) Patent No.: US 12,017,297 B2
(45) Date of Patent: Jun. 25, 2024

(54) METHOD FOR MANUFACTURING METAL MATRIX COMPOSITE PARTS

(71) Applicant: Spirit AeroSystems, Inc., Wichita, KS (US)

(72) Inventors: Rahbar Nasserrafi, Andover, KS (US); Kerrick Robert Dando, Wichita, KS (US); Gerald Eugene Hicks, Jr., Wichita, KS (US); Theodore Joseph Eilert, Wichita, KS (US); Shawn Douglas Vierthaler, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 244 days.

(21) Appl. No.: 17/559,773

(22) Filed: Dec. 22, 2021

(65) Prior Publication Data

US 2023/0191528 A1    Jun. 22, 2023

(51) Int. Cl.
*B23K 20/00* (2006.01)
*B23K 1/00* (2006.01)
(Continued)

(52) U.S. Cl.
CPC ............ *B23K 20/14* (2013.01); *B23K 1/0008* (2013.01); *C23C 18/1633* (2013.01);
(Continued)

(58) Field of Classification Search
CPC ................ B23K 20/14; B23K 1/0008; B23K 20/00–04; B23K 2103/16–172;
(Continued)

(56) References Cited

U.S. PATENT DOCUMENTS

| | | | |
|---|---|---|---|
| 4,116,689 A * | 9/1978 | Kaarlela | B23B 27/18 428/568 |
| 4,400,442 A | 8/1983 | Lewis et al. | |

(Continued)

FOREIGN PATENT DOCUMENTS

| | | | |
|---|---|---|---|
| CA | 2650605 A1 * | 11/2007 | ............ B22F 3/1125 |
| CN | 106521368 B | 3/2018 | |

(Continued)

OTHER PUBLICATIONS

European Search Report in related EP Application 22215709.1 dated May 22, 2023, 40 pages.

*Primary Examiner* — Kiley S Stoner
(74) *Attorney, Agent, or Firm* — Stinson LLP

(57) ABSTRACT

A method of manufacturing metal matrix composite (MMC) parts, including the steps of applying a metallic sheath around a bundle of MMC laminates, heating the bundle of MMC laminates in the metallic sheath at a curing or fusing temperature to consolidate the bundle of MMC laminates into a single cured or fused part, and then cooling the cured or fused part. The bundle of MMC laminates may be formed by removing surface contamination from the dry reinforcement fibers, creating a plurality of individual MMC laminates by plating dry reinforcement fibers with electroless nickel, and/or electrodeposited nickel or cobalt, and stacking each of the plurality of individual MMC laminates into a bundle. Autocatalytic and/or electroplating may be used as the primary means to incorporate fiber reinforcement into the metal matrix composite by covering and bonding fiber reinforcement into MMC laminates/plies and/or 3-D woven parts.

18 Claims, 6 Drawing Sheets

(51) Int. Cl.
  *B23K 20/14*  (2006.01)
  *C23C 18/16*  (2006.01)
  *C23C 18/32*  (2006.01)
  *C25D 3/12*   (2006.01)
  *C25D 7/00*   (2006.01)
  *B23K 103/00* (2006.01)

(52) U.S. Cl.
  CPC ........... *C23C 18/32* (2013.01); *C25D 3/12* (2013.01); *C25D 7/00* (2013.01); *B23K 2103/52* (2018.08)

(58) Field of Classification Search
  CPC ...... B23K 2103/38; B23K 2103/52–54; C23C 18/1633; C23C 18/32; C25D 3/12; C25D 7/00; B22F 2999/00; C22C 47/04; C22C 47/20; C22C 49/08; C22C 49/14; C22C 47/06
  USPC ............................ 228/121–124.6, 233.1–262
  See application file for complete search history.

(56) References Cited

U.S. PATENT DOCUMENTS

| | | | | |
|---|---|---|---|---|
| 4,867,644 | A * | 9/1989 | Wright | F01D 5/282 |
| | | | | 428/614 |
| 5,579,532 | A * | 11/1996 | Edd | B22F 1/10 |
| | | | | 419/36 |
| 5,967,400 | A | 10/1999 | Bell et al. | |
| 6,416,876 | B1 * | 7/2002 | Deve | C22C 49/00 |
| | | | | 174/128.1 |
| 9,085,818 | B2 | 7/2015 | Franchet et al. | |
| 2005/0181228 | A1 * | 8/2005 | McCullough | C22C 47/025 |
| | | | | 428/293.1 |
| 2006/0021729 | A1 * | 2/2006 | Werner | C22C 47/06 |
| | | | | 164/98 |
| 2006/0024490 | A1 * | 2/2006 | Werner | C22C 47/06 |
| | | | | 428/323 |
| 2008/0030022 | A1 * | 2/2008 | Twigg | B23K 20/023 |
| | | | | 285/21.1 |
| 2019/0169725 | A1 * | 6/2019 | Rios | C22C 47/04 |
| 2019/0341330 | A1 * | 11/2019 | Ishihara | C22C 5/02 |
| 2022/0194862 | A1 * | 6/2022 | Chen | C04B 35/571 |

FOREIGN PATENT DOCUMENTS

| | | | | | |
|---|---|---|---|---|---|
| CN | 107815620 | A | * | 3/2018 | ........... C22C 49/00 |
| CN | 110343979 | A | * | 10/2019 | |
| CN | 110480112 | A | * | 11/2019 | ............. B23K 1/008 |
| CN | 112226703 | A | * | 1/2021 | ............. C22C 47/04 |
| CN | 113512689 | A | * | 10/2021 | |
| CN | 113897562 | A | * | 1/2022 | |
| CN | 113088836 | A | | 6/2022 | |
| CN | 115044843 | A | * | 9/2022 | |
| CN | 116024528 | A | * | 4/2023 | |
| EP | 0369931 | A1 | * | 5/1990 | |
| EP | 0921202 | A2 | | 6/1999 | |
| EP | 0921202 | A3 | | 5/2000 | |
| EP | 3088556 | A1 | * | 11/2016 | ........... B22D 17/007 |
| GB | 2219006 | A | * | 11/1989 | ........ C04B 41/4584 |
| JP | 2017193813 | A | * | 10/2017 | ............. B21F 27/12 |
| JP | 2018075802 | A | * | 5/2018 | ............. B05D 7/14 |
| WO | WO-0226658 | A1 | * | 4/2002 | ............. C04B 30/02 |
| WO | WO-2013015158 | A1 | * | 1/2013 | ............. B22D 18/02 |
| WO | WO-2015025107 | A1 | * | 2/2015 | ............. B22F 5/009 |
| WO | WO-2022079385 | A1 | * | 4/2022 | |

\* cited by examiner

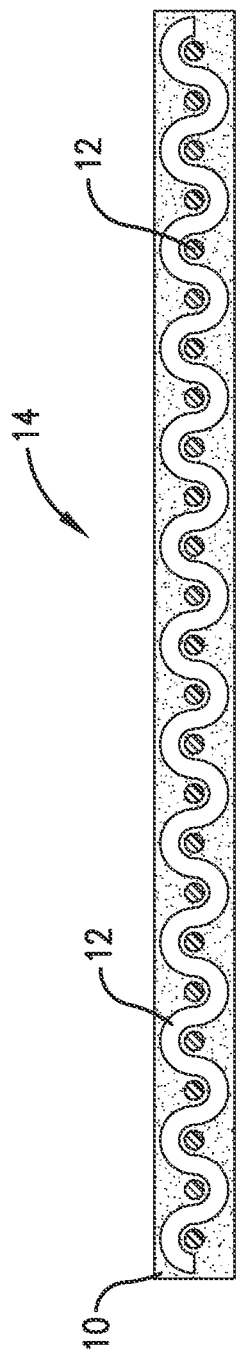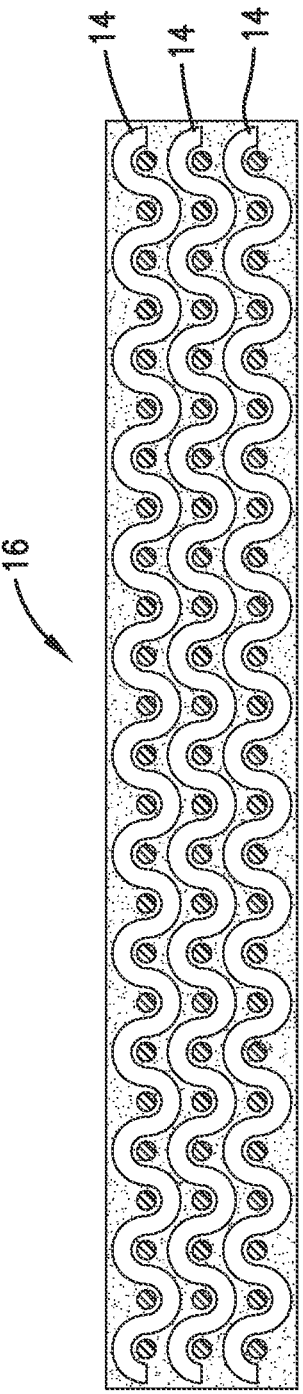

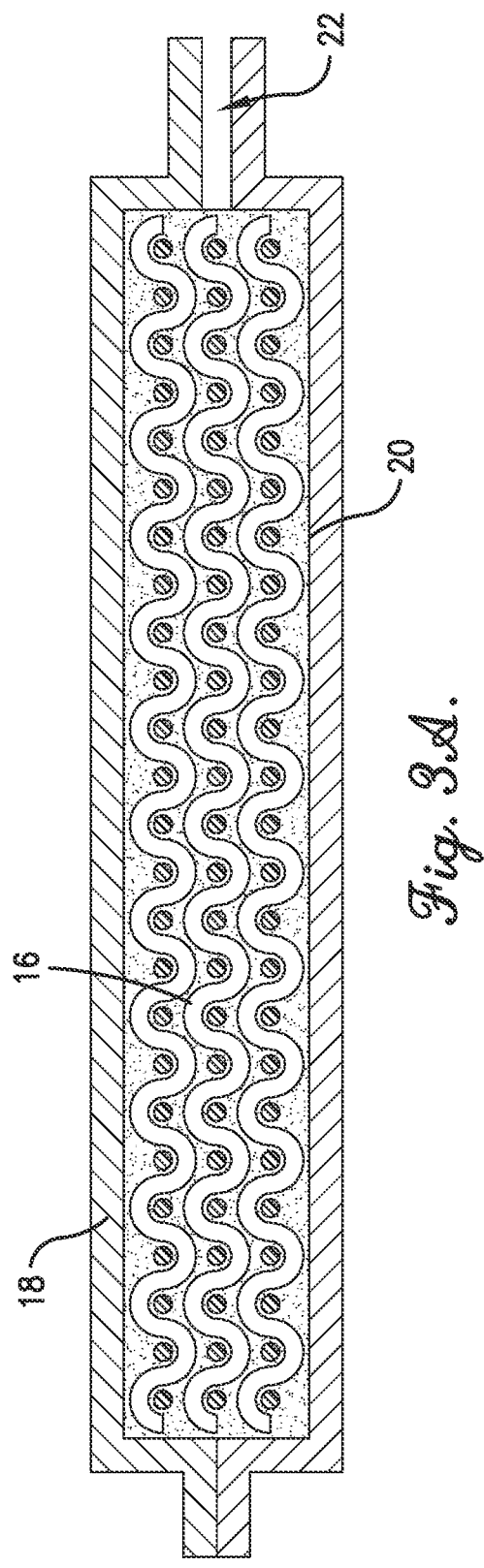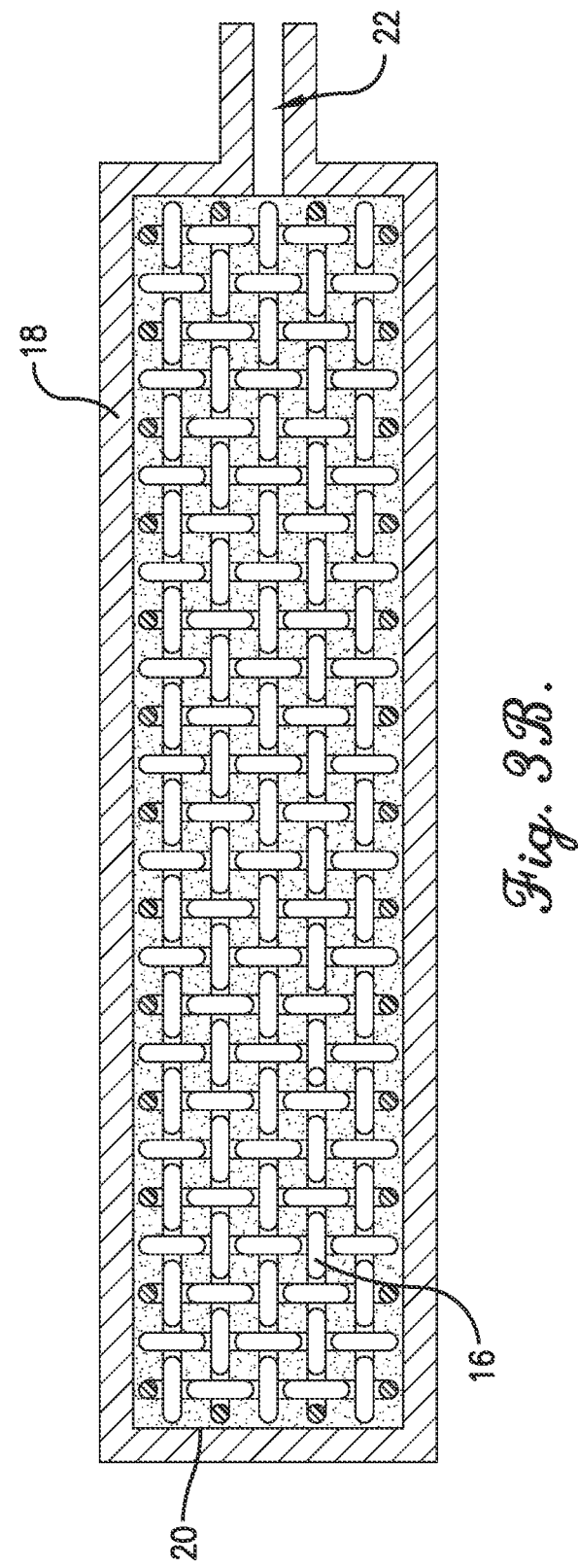

| Mechanical properties | Watt nickel | Nickel sulfamate |
|---|---|---|
| Tensile strength (MPa) | 345-485 | 415-610 |
| Elongation (%) | 10-30 | 5-30 |
| Hardness (HV 0.1) | 130-200 | 170-230 |
| Internal tensile stress (Mpa) | 125-210 | 0-55 |

METHOD FOR MANUFACTURING METAL MATRIX COMPOSITE PARTS

BACKGROUND

Metal alloy structures and various carbon composite parts are often used in the aircraft industry for structural aircraft parts. However, conventional and advanced materials used for aerospace, propulsion and hypersonic applications have various shortcomings. For example, aluminum and magnesium alloys are light weight alloys, but their application temperature is limited due to limitations in elevated temperature strength, creep resistance and galvanic corrosion resistance. Maximum use temperatures vary from 400 to 600 degrees F. Advanced polymer matrix composite structures are light weight and exhibit exceptional strength-to-weight ratio, corrosion resistance, and fatigue behavior, but are also limited to temperatures below 600 degrees F. application temperature.

Titanium alloy structures are light weight, highly corrosion resistant at ambient environments, have high strength, have good creep resistance and oxidation resistant up to 1000 degrees F. The most advanced titanium alloys exhibit creep and oxidation resistance up to 1200 degrees F. with appropriate coatings. However, titanium alloy structures are susceptible to stress corrosion cracking, hydrogen embrittlement, and solid metal induced embrittlement when heated in the presence of certain compounds as low as 600 degrees F.

Nickel and cobalt base superalloys exhibit good elevated temperature strength, creep resistance, fracture toughness and fatigue resistant. These superalloys also provide good performance between 1000- and 2000-degrees F., but they are unfortunately heavy. Ceramic matrix composites have good oxidation resistance, corrosion resistance, creep strength, and elevated temperature properties, and additionally extend the useful temperature of nickel and cobalt base superalloys by over 1500 degrees F., but they are very brittle and have very low impact strength and low fracture toughness, especially at lower temperatures.

Carbon-Carbon Composite structures are light-weight, corrosion resistant, and creep resistant, but they have very poor oxidation and burn resistance at medium or high temperatures. Refractory alloy structures also have excellent creep resistance, toughness, and high stiffness, but are very heavy and susceptible to oxidation at elevated temperatures.

Thus, the technology described herein addresses current shortcoming of conventional and advanced materials used for aerospace, propulsion, and hypersonic applications.

SUMMARY

The present invention solves the above-described problems and provides a distinct advance in the art of manufacturing composite parts. Specifically, Applicant discovered that plating dry reinforcement fiber with an electroless or electrodeposited nickel matrix and/or electrodeposited nickel or cobalt matrix to form metal matrix composite (MMC) laminate in accordance with methods herein may result in a strong, light-weight part with useful applications at very high temperatures.

Embodiments of the present invention may use electroless and/or electro-deposed nickel and/or electrodeposited cobalt to coat (cover, sheath and encompass) individual fibers, yarns/strands of fibers, fiber tows, rolls of continuously aligned carbon fibers, woven fabrics, and/or 3-D woven preform, and also to bond them into fiber reinforced MMC laminate or plies that may be subsequently stacked in proper orientations and hot consolidated into an MMC part via diffusion bonding of plies to one another. Furthermore, autocatalytic, or electroplating may be used as a primary means to incorporate fiber reinforcement into the metal matrix composite. In some embodiments, the electroless nickel coated fiber may be subsequently prepared and plated with electrodeposited nickel or cobalt to fully encompass and integrate fiber reinforcement into a nickel or nickel-cobalt base matrix to form the MMC laminates or plies. electroless or electrolytic plating of the fiber reinforcement may replace conventional powder metal or molten metal encapsulation of fiber reinforcement.

In accordance with one embodiment, a method of manufacturing metal matrix composite parts may comprise a step of applying a metallic sheath to encapsulate a bundle of MMC laminates or MMC plies in a vacuum sealed envelope. The MMC laminates or plies may be prepared by plating dry reinforcement fibers with electroless nickel or electrodeposited nickel or cobalt, cleaning to remove surface oxidization, and stacking each of the plurality of individual MMC laminates or plies into a bundle creating a plurality of individual MMC laminates or plies to be placed into a metallic sheath or envelope and vacuum sealed therein. Specifically, the sheath/sealed envelope may include a port for purging with an inert gas followed by evacuation to remove air and gasses then sealing it from the atmosphere. The vacuum sealed envelope may be heated to the desired curing or fusing temperature and pressure to metallurgically bond and consolidate the bundle of MMC laminates or plies into a single cured/consolidated or fused part followed by cooling the fused part under pressure.

In another embodiment, a method of manufacturing metal matrix composite parts includes removing surface contamination and sizing from dry reinforcement fibers, creating a plurality of individual MMC laminates or plies by plating the dry reinforcement fibers with electroless nickel or electrodeposited nickel or cobalt, and stacking each of the plurality of individual MMC laminates or plies into a bundle of MMC laminates or plies. Furthermore, the method may include applying a vacuum sealed metallic sheath (envelope) around the bundle of MMC laminates or plies, heating the bundle of MMC laminates or plies in the vacuum sealed metallic sheath to the desired curing or fusing temperature and pressure to metallurgically bond and consolidate the bundle of MMC laminates or plies into a single/fused MMC part, followed by cooling the fused MMC part under pressure.

In yet another embodiment, a method of manufacturing metal matrix composite parts may include removing surface contamination and sizing from dry reinforcement fibers and creating a plurality of individual metal matrix composite (MMC) laminates by plating the dry reinforcement fibers with electroless nickel until the dry reinforcement fibers are fully encapsulated or fully wetted by the electroless nickel. The electroless nickel coated fiber reinforcement may be subsequently cleaned and electroplated with nickel or cobalt to further coat and encapsulate the fiber reinforcement and to fill in potential gaps or voids between among the fibers and the matrix. The method may further include stacking each of the plurality of individual MMC laminates into a bundle of MMC laminates, enclosing the bundle of MMC laminates within a metallic sheath, evacuating atmosphere through an opening of the metallic sheath via vacuum, and sealing the opening of the metallic sheath during or following the evacuation step. The metallic sheath may have a melting point of at least 2500 degrees Fahrenheit. The method may also include heating the bundle of MMC laminates sealed in the metallic sheath at a curing or fusing temperature to consolidate the bundle of MMC laminates into a single fused part, shaping the bundle of MMC laminates in the metallic sheath, and then curing or fusing the fused part. The curing or fusing temperature may be in a range of temperatures from 2000 degrees Fahrenheit to 2200 degrees Fahrenheit.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein:

FIG. 1 is a side cross-sectional view of reinforcement fibers with a metal matrix forming an individual metal matrix composite (MMC) laminate, in accordance with embodiments of the present invention;

FIG. 2 is a side cross-sectional view of a bundle of MMC laminates, in accordance with embodiments of the present invention;

FIG. 3a is a side cross-sectional view of the bundle of MMC laminates placed within a metallic sheath, in accordance with embodiments of the present invention;

FIG. 3b is a top cross-sectional view of the bundle of MMC laminates placed within the metallic sheath of FIG. 3a, in accordance with embodiments of the present invention;

Figure 4:
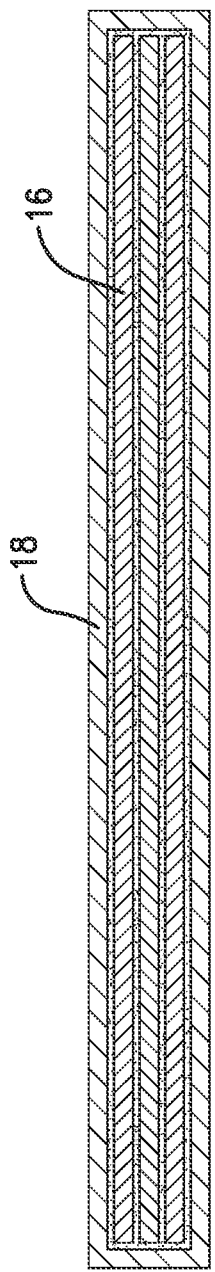
FIG. 4 is a side cross-sectional view of the bundle of MMC laminates and the metallic sheath of FIG. 3a after an opening of the metallic sheath is sealed or welded shut, in accordance with embodiments of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

To address various disadvantages in regard to heat, strength, and oxidization of traditional materials used in manufacturing structural parts for aircrafts, the present invention provides an improved method for manufacturing metal matrix composite (MMC) laminates. Advantageously, the technology disclosed herein provides a viable alternative to nickel and cobalt base superalloys and titanium alloys and provides parts with densities within the range of common titanium alloys while providing similar oxidation resistance and appreciably higher strength than both titanium and superalloys. Specifically, the methods described herein can result in finished parts having a strength in the range of 300 kilo pounds per square inch (ksi) to 400 ksi. The technology disclosed herein also results in parts with creep resistance equal or in excess of nickel and cobalt base superalloys.

Generally, methods for producing continuous or chopped carbon fiber reinforced metal matrix composites (MMC) are disclosed herein for use in finished parts, such as composite aircraft components or the like. In some example embodiments, methods producing continuous or chopped carbon fiber reinforced MMC parts or nickel-based composite parts may include thorough surface cleaning of a dry woven carbon fiber, ceramic cloth, unidirectional fiber or three dimensional woven preforms followed by electroless nickel (EN) plating to a thickness that provides slightly higher coating volume than a desired space in between the reinforcement fibers of the finished part, in order to fully encapsulate the woven fabric surfaces. Multiple layers may be coated by EN plating or the like into individual laminates. This and other techniques described herein essentially replace the thermoplastic matrix traditionally used in thermoplastic composite manufacturing with a metal matrix such as an electroless nickel matrix applied in accordance with methods herein to fully encapsulate the reinforcement fiber. Note that the term "fully encapsulate" as used herein refers to greater than 98% encapsulation of the reinforcement fiber (i.e., no more than 2% void content), which may provide a sufficient degree of encapsulation to provide the improved properties described herein.

Once a metal matrix such as an electroless nickel or electrolytic nickel matrix is applied to encase and embody continuous, chopped, or woven carbon and other fiber reinforcement material into individual MMC laminates, the MMC laminates are then bundled and encased by encapsulation into a vacuum sealed envelope (also referred to herein as a metallic sheath) made of sacrificial metallic cover sheets/plates. The MMC laminates encased in the metallic sheath are subsequently heated and then pressed to become fully consolidated and formed into desired shapes using techniques such as those used for thermoplastic composite stamping/fabrication, except that the thermoplastic matrix is replaced by electroless or electrolytic nickel (e.g. sulfamate nickel), nickel cobalt, and/or refractory nickel matrix with or without suspension of nano-ceramic dispersoids. The heat and pressure applied to the evacuated envelope containing the MMC laminates allow complete consolidation of the MMC laminates as the laminates are formed into desired shapes. Upon completion of consolidation/forming, the resulting part is trimmed and the sacrificial cover removed. The resultant MMC part is inspected and processed further (e.g., holes drilled), machined, coated with thermal barrier coating, and assembled into a desired structure.

Advantageously, the resulting MMC parts formed via methods disclosed herein can offer increased strength, elastic modulus, and significantly higher application temperature than carbon fiber reinforced plastics, thereby expanding the application temperature capability over three times that of carbon fiber reinforced plastic (CFRP) composites. The application temperature referred to herein is defined as the maximum useful temperature of the part that is 150 to 250 degrees F. below the melting temperature of the metallic sheath, and also 50 to 150 degrees F. below the consolidation/curing/bonding or fusing temperature of the nickel MMC (approximately 1500 degrees F.-2100 degrees F. application temperature). These MMC parts also have appreciably higher toughness than ceramic matrix composites. Note that while offering a similar density than Nickel 718, MMC parts (e.g., electroless metallic carbon fiber composite) with 50% carbon fiber content weighs nearly 40% less than Nickel 718 and close to that for titanium alloys. In addition, carbon fibers impart significant improvements in stiffness and help maintain strength at temperatures beyond the capabilities of Nickel 718 and its other derivatives.

Other benefits of using the electroless nickel matrix or boron matrix in accordance with the methods herein include extending the useful application temperature of polymer reinforced plastics from somewhere in the range of 500 to 600 degrees F. to somewhere in the range of 1500 to 2100 degrees F. Although the resulting MMC part may not be able to be used up to the upper temperature limit of ceramic matrix composite in some embodiments, it can still provide a high performance, light-weight bridge between applications where polymer matrix composites are used and applications where ceramic matrix composites are used (such as for hypersonic applications). Besides having higher strength than nickel base superalloys, the MMC part can be significantly lighter and closer in density to titanium alloys than the nickel base superalloys it replaces.

FIGS. 1-7 disclose step-by-step schematics for manufacturing a finished MMC part in accordance with methods herein. The methods disclosed herein generally replace the thermoplastic matrix of prior art composite part manufacturing methods with electroless nickel, and or electroplated nickel or matrix (or alternatively cobalt) applied to fully encapsulate reinforcement fiber, as described in detail below. The reinforcement fiber in the methods described herein may be, for example, continuous or chopped carbon fiber, or in some embodiments the fiber may be a boron or silicon carbide. Furthermore, the reinforcement fiber may comprise individual fibers, yarns/strands of fibers, fiber tows, rolls of continuously aligned carbon fibers, woven fabrics, and/or 3-D woven preform. To ensure full encapsulation (i.e., equal to or greater than 98% encapsulation or no more than 2% voids) of the reinforcement fibers in the electroless nickel matrix or cobalt matrix, testing may be performed. For example, witness coupons may be made when coating carbon fiber with nickel and, or cobalt to ensure fibers are fully coated. These witness coupons may be ultrasonically or radiographically inspected or destructively tested via optical metallographic and scanning electron microscopy (SEM) methods. Energy dispersive spectrometry (EDS) may be performed with SEM. Alternative methods such as electron microprobe may also assist in more detailed evaluation of fiber coating quality.

Figure 8:
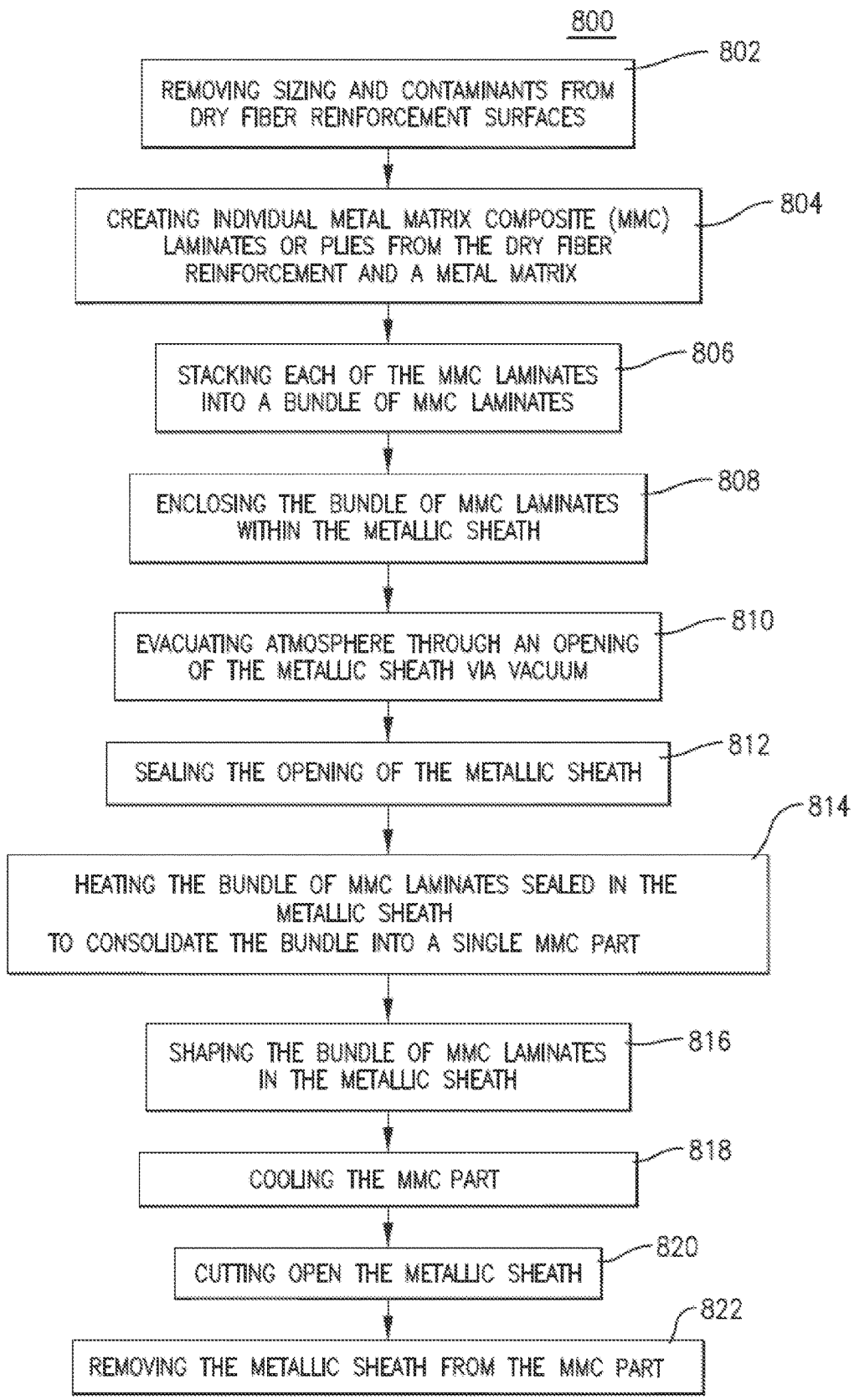
FIG. 8 is a flow chart of a method for manufacturing an MMC part in accordance with embodiments of the present invention.

The flow chart of FIG. 8 depicts the steps of an exemplary method 800 for manufacturing an MMC part or structure in more detail. In some embodiments of the invention, various steps may be omitted or steps may occur out of the order depicted in FIG. 8 without departing from the scope of the invention. For example, two blocks shown in succession in FIG. 8 may in fact be executed substantially concurrently, or blocks may sometimes be executed in the reverse order depending upon the functionality involved.

In some embodiments, the method 800 may include a step of removing sizing and contaminants from surfaces of a dry reinforcement fiber, as depicted in block 802. For example, thorough surface cleaning of a dry woven carbon fiber, ceramic cloth, unidirectional fiber or three dimensional woven preforms may be accomplished using various deoxidizing methods and other surface cleaning methods. Furthermore, if a dry reinforcement fiber has already been plated or coated by electroless nickel, electroplated, or chemical vapor deposition (CVD), additional cleaning may be needed and may include deoxidizing the surfaces of the resulting pre-plated reinforcement fiber for a next plating step to effectively bond thereto. That is, the cleaning may be performed to remove any surface oxide on the surface of the pre-plated reinforcement fiber, as surface oxide can undesirably prevent the metallic matrix or electroless nickel from diffusing with the reinforcement fiber in the subsequent steps described herein.

For example, the following processes may be used to clean and prepare the reinforcement fiber for deposition: First the fiber may be cleaned to remove sizing and surface contaminants to allow complete wetting and full deposition of nickel on the carbon fiber. The term "sizing" herein may refer to an organic coating or the like, such as polyethylene oxide (PEO) or polyvinyl alcohol (PVA). However, other sizing can be removed using the methods disclosed herein without departing from the scope of the technology herein. Sizing may be removed thermally, for example, 15 minutes at 750 degrees F. to ablate the sizing from the carbon fiber surface and allow the electrolytic solution to wet the clean carbon fiber surface. Alternatively, solvent cleaning methods and alkali cleaning may be done alone, sequentially, or after thermal cleaning. However, any removal of surface contaminants from the reinforcement fiber may be used without departing from the scope of the technology herein. "Cleaning" as used herein may include degreasing, removing dirt and dust, removing sizing and contaminants, and de-oxidation, and may also be required for metal plating on reinforcement fibers (fibers, cloth, tows, laminates, and the like).

Once the fiber has been cleaned, the method 800 may include creating a plurality of individual MMC laminates or plies from the dry fiber reinforcement and a metal matrix, as depicted in block 804 and described below. Specifically, this step depicted in block 804 may include plating or performing electroless deposition of electroless nickel 10 or electrodeposited nickel or cobalt on the cleaned reinforcement fiber 12 to create the MMC laminates, as depicted in FIG. 1. For example, this may be accomplished by inserting the reinforcement fiber 12 into an appropriate activation bath to ensure its surface is hydrophilic. Immersion in a bath of the electroless nickel 10, for example, at proper temperature for an adequate amount of time may ensure that fiber weave of the dry reinforcement fiber is coated to a desired thickness in order to form MMC laminates 14 that, upon stacking and consolidation, result in fully dense electroless nickel-based fiber reinforced composite without gaps. In-process checks may be utilized to optimize deposition rates. Note that in some embodiments, nickel, cobalt, and/or iron may be co-deposited (electrodeposited or electroless deposited) and may replace all or part of the nickel as the matrix described herein.

In order to fully bond and encapsulate reinforcement fibers into the nickel matrix, it is often desired to apply coatings in multiple layers. Anodic acid etching or acid immersion in sulfuric acid, HF/HNO3, or the like. may be used to remove any surface oxide, surface contaminants, and to prepare the surface previously plated to effectively allow new deposit bonding sites to the previously deposited layer. Etching may also roughen the surface and makes it more receptive of a next deposition layer. After each laminate is made and before bundling together for hot consolidation (i.e. before placement into a metallic sheath/envelope as later described herein) the laminates may also be cleaned and reactivated/deoxidized as discussed in previous paragraphs.

Additionally or alternatively, electrodeposition may be used to plate the cleaned reinforcement fiber 12. Electrodeposition may be accomplished via direct or pulsed current or pulse reversal current, for example. In addition, electrodeposition may be accomplished conventionally or via sediment deposition techniques. Various solution agitation methods such as magnetic stirring, ultrasonic vibration, use of non-reactive or coated propellers, or pump agitation may be used to aid homogeneity and uniformity of the metallic deposit.

In some embodiments, nickel strike, sulfamate or Watts nickel baths and electrodeposition may be employed to coat and bond the reinforcement fiber 12. In other words, the metal matrix (e.g., electroless nickel 10) for the MMC laminates 14 may be made using autocatalytic and/or electrodeposition. For example, autocatalytic and/or electroplating may be used to both coat (e.g., cover, sheath and encompass) and bond/integrate fiber reinforcement into the fiber reinforced metal matrix composite plies or laminate described herein (e.g., the MMC laminates). That is, in some embodiments, autocatalytic and/or electroplating may be used as a primary method to incorporate fiber reinforcement into the MMC part described herein.

Nickel or copper strike may be used to create an appropriate surface condition, in some embodiments, for the laminates or plies described herein. For example, surfaces activation may determine the quality and soundness of adhesion, since surface oxide or contaminants may undesirably prevent wetting or metallurgical bonding during consolidation described herein. Thus, once the surfaces have been cleaned and activated as described herein, a nickel or copper strike may assist the plating process by depositing a thin and uniform metallic surface that may be useful for electroplating applications. However, a nickel or copper strike may not be needed for electroless nickel deposition. The chemical composition of the electroless or electrodeposited nickel plating may be selected to result in a plating alloy with optimized melting range to allow forming and full consolidation/bonding of these MMC laminates 14, as described in subsequent steps herein.

Inserting the reinforcement fiber 12 into an appropriate activation bath can result in the forming of an MMC laminate 14, as depicted in FIG. 1. Complete wetting of the fibers during this step can allow good diffusion and create a strong metallurgical bond during the subsequent consolidation and curing or fusing steps. However, there are other methods of introducing the nickel or electroless nickel in step 804, such as comingled fibers or the like without departing from the scope of the technology herein. Alternatively, in some embodiments, the steps of plating or electroless deposition of the cleaned reinforcement fiber to create the MMC laminate may be omitted in favor of precoated fiber or carbon fiber laminates that are chemical vapor deposited.

As noted above, the processes for electroless nickel plating may be optionally modified by substituting cobalt for nickel. Likewise, in some embodiments, more complex alloy compositions or even nano-ceramic composite may be produced for the methods described herein by suspension of solid particles embedded in the electroless nickel solution coat. This method allows the suspended particles in the plating bath to become an integral part of the growing metallic layer surrounding and enveloping them. This way the electroless nickel or cobalt coating may be alloyed with tungsten, rhenium, chromium, niobium, or alternatively embed ceramic particles such as SiC, Nano industrial diamond, or aluminum oxide ceramic, for example.

In some embodiments, following the electroless nickel application (which has a higher content of phosphorus), a thin layer of electrodeposited nickel may be added, providing a pure nickel coating. The phosphorus of the electroless nickel may still oxidize a little bit, but the pure nickel coating applied thereafter may advantageously be resistant to oxidization. The electroless nickel may thus provide an anchor to the carbon fiber while the traditional electroplate nickel can create a seal around the electroless nickel to prevent oxidization. The electroless nickel thus provides a first coating layer that may be fairly uniform since it is not electrolytic and may thus go down evenly and any edge effects or corner effects will be minimal or nonexistent. Then the electrodeposited nickel may be flash coated on top of the first coating layer. In some alternative embodiments, instead of fully relying on electroplating or electroless plating to deposit nickel alloy, one option may be to use comingled carbon fibers with nickel base superalloy wire. This way only part of the nickel alloy matrix is made by plating. This also allows use of highly alloyed nickel-based wire (e.g., Haynes 230 or Nickel 718) and provides improved properties over Sulfamate nickel to incorporate into a final MMC part.

In order to tailor mechanical properties, pre-alloyed electroless nickel solutions such as nickel-cobalt-phosphorus; nickel-iron-phosphorus; nickel-tungsten-phosphorus; nickel-niobium-phosphorous, nickel-rhenium-phosphorus; nickel-molybdenum-boron; nickel-tungsten-boron; and others may be used in place of binary nickel boron or nickel phosphorous alloys. Co-deposition of more than one element with or without nano-ceramic constituents may be accomplished via electrodeposition/electroplating methods. These pre-alloyed solutions may provide improved corrosion resistance, hardness, high-temperature resistance, and/or electrical properties, depending on desired mechanical properties for a given part. In addition, tertiary or quaternary compositions can improve mechanical properties at various temperatures, corrosion resistance, wear resistance and help limit grain growth during the consolidation/hot forming operations. In some example embodiments, composite electroless nickel coatings with SiC, BN, Al2O3, TiO2, or the like may be used as the matrix material for forming of the parts using the methods described herein.

Once electroless nickel, electroplated nickel, or pre-alloyed nickel/fiber composite laminates or MMC laminates are created as explained above, the method 800 may include stacking the MMC laminates into a bundle 16, as depicted in block 806 and FIG. 2. In some embodiments, this stacking may occur following another cleaning of the individual MMC laminates 14 (e.g., via an interim cleaning) to remove any surface oxidation or any other undesirable elements using one or more of the techniques described above or known in the art. Following this interim cleaning, the bundle 16 may be created by stacking individual MMC laminates 14 on top of each other.

The stacking (also referred to as ply stacking) may be unidirectional stacking in which the woven fibers of each MMC laminate 14 or ply are all stacked with identical orientations or may be alternating in woven fiber orientation. For example, a first ply may have a 45-degree orientation difference from a second ply stacked on top of the first ply, and the second ply may have a 45 degree orientation difference from a third ply stacked on top of the second ply. However, other alternating orientations of the MMC laminates 14 may be uses without departing from the scope of the technology described herein.

Both continuous and highly-aligned short fiber composite materials may be incorporated with the MMC laminates 14 as reinforcement material prior to or during the stacking step. Use of highly-aligned short fiber composite materials may facilitate forming into more complex shapes, and if done judiciously may increase the volume fraction of reinforcement fiber. In addition, due to consolidation of individual MMC laminates 14, the methods described herein allow for buildup of localized areas to higher ply thickness (e.g., MMC laminate pad-ups), advantageously reducing the need for machining. This concept may be akin to additive manufacturing versus material removal by machining, which constitutes a reductive manufacturing process. Similarly, this buildup of localized areas is especially useful because machining of MMC parts following curing and/or fusing thereof can be slow, difficult, and expensive.

The method 800 may further include a step of placing the bundle of MMC laminates 14 within a metallic sheath 18 as depicted in block 808 and FIGS. 3*a*-3*b*. This metallic sheath 18 may be formed, for example, by sandwiching the bundle 16 of MMC laminates 14 between two ductile, oxidation-resistant metallic sheets or plates. The metallic sheets or plates may each be, for example, a foil gauge down to 0.010 inch or the like. In some embodiments, stainless steel or nickel base alloys may be used in this step. In an alternative embodiment, a single metallic sheet or plate may be folded and the bundle of MMC laminates 14 may be placed between two resulting portions of the single metallic sheet forming the metallic sheath 18.

In some embodiments, prior to placing the bundle 16 of the MMC laminates 14 into the metallic sheath 18, some embodiments may include coating 20 inside surfaces of the metallic sheath 18 with a release agent to prevent bonding of consolidated MMC laminates 14 to the metallic sheath 18. The release agents or coating 20 may be typical coatings made of boron nitride, silicon dioxide, titanium oxide, yttrium oxide, zircon, or partially stabilized zirconium oxide, for example. Alternatively the stainless sheet or nickel alloy sheath may be pre-oxidized to prevent diffusion bonding to the nickel MMC plies. In other embodiments, use of a sacrificial foil or sheet between the metallic sheath 18 and the bundle 16 may be employed to stop diffusion bonding between the bundle 16 and the metallic sheath 18 in order to facilitate post-curing and/or post-fusing removal of the MMC part from within the metallic sheath 18.

Enclosing the bundle 16 of MMC laminates 14 within the metallic sheath 18 may also include, in some embodiments, welding the two metallic sheets or plates together. "Welding," as used herein, may refer to resistances welding or any other types of welding known in the art for sealing peripheral portions of the two metallic sheets or plates together. The welding may be performed all around peripheral edges or edge portions of the plates except for at an opening 22, as depicted in FIGS. 3*a* and 3*b*, thus creating a welded chamber (i.e., the metallic sheath 18) out of the plates with an open port for a subsequent evacuation step. However, note that the bundle 16 of MMC laminates 14 may be placed into any metallic sheath having an open port using other techniques without departing from the scope of the technology herein.

The method 800 may also include evacuating air or atmosphere via the opening 22 from within the resulting metallic sheath 18 (e.g., via vacuum or other such evacuation methods), as depicted in block 812. Along with the air or atmosphere evacuated therefrom, water vapor and or other contaminants may also be removed during this step. The method 800 may further include a step of sealing (e.g., welding) the opening of the metallic sheath 18 shut immediately following evacuation and/or while evacuation is still in process, as depicted in block 812, in order to create a ductile vacuum sealed enclosure. The bundle of MMC laminates 14 fully sealed/welded within the metallic sheath 18 is depicted in FIG. 4.

Note that, prior to sealing the metallic sheath opening shut, an optional purge of the metallic sheath with an inert gas may be used to reduce air content therein prior to evacuation and sealing of the metallic sheath to help reduce moisture and oxygen concentrations to a very low level. Furthermore, in some embodiments, inert gas may be used to deliver controlled levels of dry Ammonium Fluoroborate within the metallic sheath in order to neutralize any chance of surface reaction that could impede full bonding/consolidation among MMC laminates 14. Additionally or alternatively, before sealing the vacuum sealed metallic sheath, ammonium flu-borate may act as an in-situ de-oxidation agent during heat exposure.

The metallic sheath 18 described herein may be made out of a metal that remains solid while pliable at relatively low pressures. In some embodiments, the metallic sheath 18 may be made of metal with a melting point of at least 2500 degrees F. For example, the metallic sheath 18 may be made from mild steel which may be coated to resist oxidation/scaling on its surfaces exposed to atmosphere when heated. The oxidation/scaling-resistant coatings may include glass coatings such as those used for protection of hard metal alloys for heating and forging. Additionally or alternatively, the metallic sheath 18 may be made from ferritic, austenitic steels, or nickel base alloys. Some example materials for use in the two plates welded to become the enclosure described herein include: a 430 stainless steel (which begins to melt at 2600 degrees F.) or a 310 stainless (which begins to melt at 2550 degrees F.). Furthermore, some of these example stainless steels may offer 40% elongation in their annealed conditions at room temperature, are highly weldable, and have a useful temperature range of up to 2150 degrees F. for this application.

Figure 5:
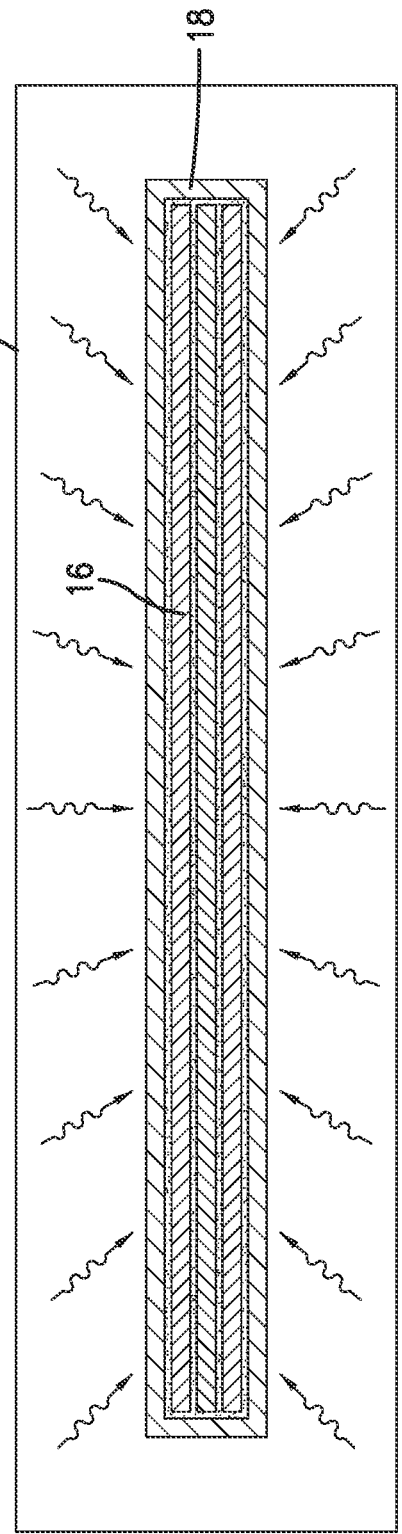
FIG. 5 is a side cross-sectional view of the bundle of MMC laminates placed within the metallic sheath of FIG. 4 which is placed within a furnace for heating, in accordance with embodiments of the present invention.

The method 800 may further include a step of heating the metallic sheath 18 with the bundle 16 of MMC laminates 14 therein at curing or fusing temperature while under pressure, as depicted in block 814 and FIG. 5, to consolidate the bundle 16 into a single cured/consolidated or fused MMC part. The heat may be applied in a traditional furnace, an infrared oven, or using any other heating methods known in the art of curing and/or fusing composite parts. In some embodiments, the encapsulated MMC laminate bundle 16 may be heated to a temperature range within the solidus/liquidus temperature of the electroless nickel matrix (e.g., above a melting point of the electroless nickel matrix or cobalt matrix), but below the solidus temperature or melting point of the encapsulating metallic sheath (e.g., 2500 degrees F.). Additionally or alternatively, the temperature applied during the heating step may be at least 50 degrees F. or at least 150 degrees F. below the melting temperature of electroless nickel or nickel cobalt or higher, while still remaining below the melting point of the metallic sheath. Specifically, in some embodiments, the temperature applied during the heating step may be no lower than 50 to 150 degrees F. above the melting temperature of the electroless nickel or nickel cobalt while also remaining below the solidus temperature or melting point of the metallic sheath. However other temperature ranges may be used without departing from the scope of the technology described herein. For example, the temperature applied during the heating step may be in the range of 2000 degrees F. to 2300 degrees F. to achieve a desired diffusion bonding of the MMC laminates 14 without melting the metallic sheath 18. Note that consolidation may occur as low as 1800 degrees F. or as high as 2200 degrees F. However, lower temperatures may also lower the application temperature limit for the part. On the other hand, higher temperatures may add to the manufacturing cost.

In some embodiments, the most preferred temperature range for bonding/consolidating and curing or fusing the bundle (e.g., nickel MMC laminate bundle) may be between 2000 degrees F. to 2200 degrees F., but some embodiments herein may include a range between 1800 degrees F. and 2300 degrees F. The time and temperature may be set such that the method results in fully wetting and fully coating each of the fibers of the MMC laminates 14 via adequate fluidity at specified consolidation temperatures. electroless nickel 10 may advantageously allow complete coating of all reinforcement fiber 12 material of the MMC laminates 14. After encasing the reinforcement fibers 12 as described above, sulfamate nickel may be applied to fill in any gaps and also to increase the useful temperature of the nickel alloy matrix to the desired range.

The metallic sheath 18 (e.g., the vacuum sealed enclosure) effectively creates a high temperature-resistant, environmental-resistant vacuum sealed shield over the MMC laminate bundles 16 that prevents re-oxidation of the MMC laminates 14 during consolidation thereof. In some embodiments, consolidation of the MMC laminates 14 may be accomplished by Hot Isostatic Pressing (HIP) processing of the vacuum sealed envelope (e.g., the metallic sheath 18). For example, 15,000 psi may be used via the HIP processing to create the consolidation of the MMC laminates 14 in the metallic sheath 18. Typically Hot Isostatic Pressing may be done between 14,500 psi and 45,000 psi. That said, delta pressure forming, superplastic forming, or hot forming may be done at much lower pressures, for example 300 to 5,000 psi pressure differential. However, other consolidation techniques may be used without departing from the scope of the technology described herein. For example, delta pressure forming or hot forming may be done at much lower pressures.

Figure 6:
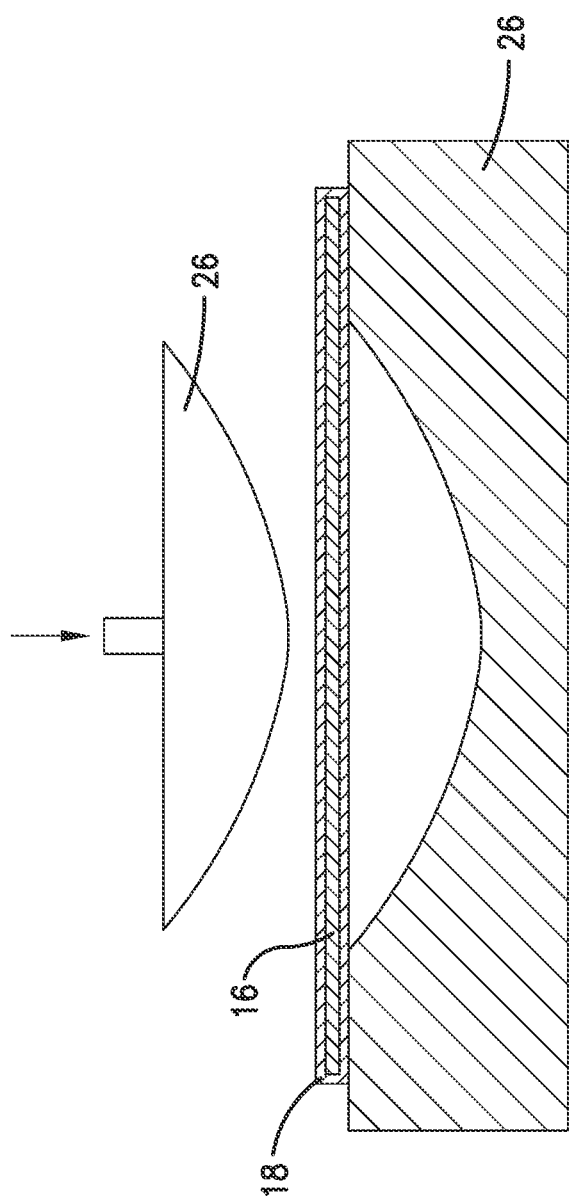
FIG. 6 is a side cross-sectional view of the bundle of MMC laminates placed within the metallic sheath and resting on a die for shaping of the MMC laminates, in accordance with embodiments of the present invention.

In some embodiments, the method 800 may also include a step of shaping/consolidating the MMC laminates 14, as depicted in block 816 and FIG. 6. In some embodiments, this shaping step may occur as the heat is applied thereto or shortly thereafter but before the MMC laminates 14 cool. For example, the bundle of the MMC laminates 14 may be placed in and shaped by a consolidation/forming tooling such as a heated press or a set of dies 26 configured for the attainment of full density in the desired shape of the resulting MMC part 28, as depicted in FIG. 6. The consolidation/forming tooling used in the methods described herein may be sized, shaped, and/or designed to accommodate localized changes in stack-up thickness of the MMC laminates 14. In some embodiments, more complex MMC parts such as those containing pad-ups may require a higher fidelity method for alignment (i.e., laser project system for pre-alignment, alignment pins for correct placement in the press, and the like). These techniques may be used to align fiber laminates to each other in proper orientations and also to properly align the laminate bundle 16 to the tooling described herein. Following these heating and shaping/consolidation steps, method 800 may then include a step of cooling the MMC laminates 14 and/or the metallic sheath 18, as depicted in block 818.

In some embodiments, there may be circumstances where it is desired to have a surface layer with a standard alloy composition, in which the metallic sheath 18 is left uncoated and cleaned, with its surface activated prior to welding around the MMC laminates 14. In such cases the cleaned, deoxidized, and pre-activated sheet metal sheath may form effective metallurgical bond onto the nickel MMC laminates for further improvements in environmental resistance.

In one embodiment, the vacuum sealed envelope or metallic sheath 18 may be placed inside a vacuum furnace utilizing high temperature metallic alloy, graphite, or ceramic dies to help form the nickel MMC into complex configurations. In such cases, where match dies are used to form and consolidate nickel MMC plies or other MMC laminates, for example, a softer driver plate may be heated and placed on top of the metallic sheath 18 to transfer force uniformly onto the surface to ensure full contact between the metallic sheath 18 and the MMC laminates 14, ensuring complete diffusion bonding across an entire stack-up or entire bundle 16 of the MMC laminates 14. This can be akin, for example, to using rubber or elastomers as a medium to apply pressure uniformly onto sheet metal when cold forming.

Additionally or alternatively, in some embodiments, the individual MMC laminates 14 and/or the metallic sheath 18 may be pre-formed before bundling, encased to allow consolidation into stiffened profiled shapes, or bonded with formed or machined stiffeners or frame pieces made from other high temperature alloys into integrally stiffened composite refractory alloy hybrids. In the case of bonding with stiffeners or frame pieces, inert gas pressure may be used to apply the pressure needed to diffusion bond the stiffeners or frame pieces to the MMC laminates 14 inside the forming/consolidation dies. Please note that regardless of the embodiment, pre-coated nickel MMC plies or other MMC laminates described herein generally need to be thoroughly cleaned, deoxidized/surface activated before bundling and hot forming and or consolidation to achieve effective metallurgical bonds.

Figure 7:
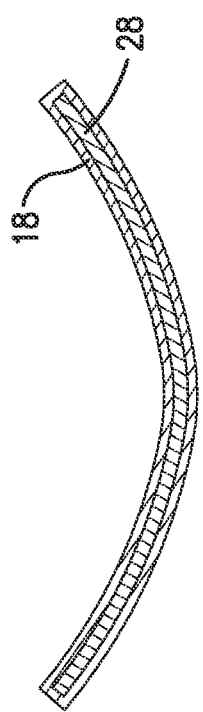
FIG. 7 is a side cross-sectional view of the bundle of MMC laminates within metallic sheath after being shaped by the die of FIG. 6, in accordance with embodiments of the present invention.

An example of an MMC part 28 surrounded by the metallic sheath 18 after the cooling step and removal of the finished MMC part from the set of dies 26 is depicted in FIG. 7. Following removal of the MMC part 28 from the set of dies 26, also referred to in some embodiments as de-molding, the welded (or otherwise sealed) edges of the metallic sheath 18 may be cut off and the two plates or metallic sheets may be removed from the formed MMC part 28. Specifically, some embodiments of the method 800 may include cutting open the metallic sheath 18, as depicted in block 820, and removing the metallic sheath 18 from the fused MMC part 28 (or removing the MMC part 28 from the metallic sheath 18), as depicted in block 822. Then the MMC part 28 may be trimmed, punctured, drilled, or machined in any way desired for finishing the MMC part 28.

In some embodiments, following formation of the finished part as described above, the finished part may be subsequently inspected using non-destructive methods to ensure full encapsulation of fibers in the metal matrix (e.g., the nickel matrix) and to ensure that there is no evidence of disbanding or other defects. Such non-destructive methods may include, for example, ultrasonic inspection, radiographic methods including real-time and computed tomography, thermographic inspection, and various other techniques with process parameters optimized to ensure full compliance with quality requirements for a given finished part.

Figures 9, 10:
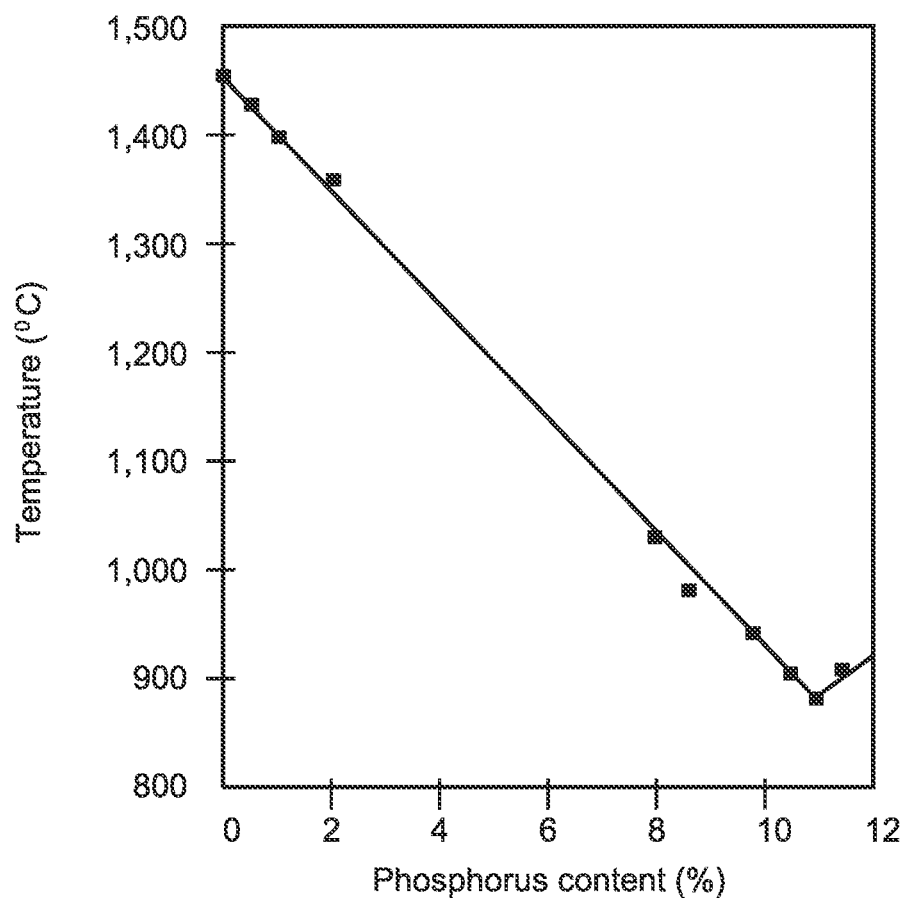
FIG. 9 is a chart comparing the percent of phosphorus content of an MMC part with its melting temperature, in accordance with embodiments of the present invention.
FIG. 10 is a table comparing Watt nickel and Nickel sulfamate's mechanical properties, in accordance with embodiments of the present invention.

FIG. 9 depicts an example of the electroless nickel compositional effects in melting temperature of the electroless nickel matrix. FIG. 10 is a chart providing a comparison of electroplated nickel with nickel sulfamate nickel coating, demonstrating over 80 ksi tensile strength with 5-30% elongation. Ni—Co deposits with W, Rh, Nb, Ti, or with Nano SiC particles can produce significant increase in strength with some reduction in ductility. For example, Ti and Al are known to promote gamma prime precipitation, while Nb and Ta are known to result in precipitation of gamma double prime that are both known strengthening agents widely applied to development of high temperature nickel base superalloys.

Based on rule of mixtures, a fully dense 50% electroless nickel, cobalt, or hybrid matrix composite with 50% carbon fiber content could offer (0.5×100 ksi+0.5×600 ksi=350 ksi strength), along with other benefits such as low fatigue crack propagation rates due to the presence of continuous carbon fibers, and useful temperature range of over 1500 degrees F., depending on the composition of the solution used to form the electroless nickel matrix material. Expected results can be, for example, a maximum of 55% for fabric and 60% with unidirectional tape. The quantity of matrix and fiber incorporated into the metallic bag for forming can influence the desired volume fraction.

Although the invention has been described with reference to the preferred embodiment illustrated in the attached drawing figures, it is noted that equivalents may be employed and substitutions made herein without departing from the scope of the invention as recited in the claims of a subsequent regular utility patent.

The invention claimed is:

1. A method of manufacturing metal matrix composite parts, the method comprising:
applying a metallic sheath around a bundle of metal matrix composite (MMC) laminates or plies;
heating the bundle of MMC laminates or plies in the metallic sheath under pressure at a fusing temperature to consolidate or metallurgically bond the bundle of MMC laminates or plies into a single fused part, wherein the MMC laminates or plies comprise an electroless nickel or cobalt matrix, wherein the fusing temperature is above the solidus temperature of the electroless nickel or cobalt matrix but is below the solidus temperature of the metallic sheath; and
cooling the fused part.

2. The method of claim 1, further comprising manufacturing the bundle of MMC laminates or plies by:
creating a plurality of individual MMC laminates or plies by plating reinforcement fibers with electroless or electrodeposited nickel, or cobalt, or a co-deposited matrix of cobalt-nickel, iron-nickel, nickel-iron-cobalt, or cobalt-tungsten, and
stacking each of the plurality of individual MMC laminates or plies into a bundle.

3. The method of claim 2, wherein the manufacturing of the bundle of MMC laminates or plies further comprises: prior to plating the reinforcement fibers, removing surface contaminants and sizing from the reinforcement fibers.

4. The method of claim 2, wherein the reinforcement fibers comprise at least one of continuous or chopped carbon fiber, dry woven carbon fiber, boron fiber, ceramic-fibers, ceramic cloth, unidirectional ceramic fiber yarn or strands, fiber tows, silicon carbide, boron, and three-dimensional woven preforms made of ceramic, boron, or carbon fibers.

5. The method of claim 2, wherein the plating is accomplished via autocatalytic or electroplating or by placing the reinforcement fibers into an activation bath comprising electroless nickel or cobalt.

6. The method of claim 2, wherein the plating is accomplished by placing the reinforcement fibers into an activation bath comprising an electroless nickel, nickel cobalt, or refractory nickel matrix with or without suspension of nano-ceramic dispersoids.

7. The method of claim 2, wherein the electroless nickel or cobalt is alloyed with tungsten, rhenium, chromium, niobium, or embed ceramic particles.

8. The method of claim 1, wherein applying the metallic sheath further comprises enclosing the bundle of MMC laminates or plies in the metallic sheath, evacuating atmosphere through an opening of the metallic sheath, and sealing the opening of the metallic sheath prior to heating the bundle of MMC laminates or plies.

9. The method of claim 1, wherein the fusing temperature is in a range of 1,800 degrees Fahrenheit to 2,300 degrees Fahrenheit.

10. The method of claim 1, wherein the bundle of MMC laminates or plies comprises reinforced fibers coated and fully encapsulated in electroless nickel or cobalt.

11. A method of manufacturing metal matrix composite parts, the method comprising:
removing surface contamination and sizing from dry reinforcement fibers;
creating a plurality of individual metal matrix composite (MMC) laminates or plies by plating the dry reinforcement fibers with at least one of electroless nickel, electroplated nickel, and electroplated cobalt;

stacking each of the plurality of individual MMC laminates or plies into a bundle of MMC laminates or plies;

applying a metallic sheath around the bundle of MMC laminates or plies, wherein a sacrificial foil or sheet is placed between the metallic sheath and the bundle or wherein inside surfaces of the metallic sheath are coated with a release agent or pre-oxidized to prevent bonding of the MMC laminates or plies to the metallic sheath;

heating the bundle of MMC laminates or plies in the metallic sheath at a curing or fusing temperature to consolidate the bundle of MMC laminates or plies into a single fused part; and cooling the fused part.

12. The method of claim 11, wherein the dry reinforcement fibers comprise at least one of continuous or chopped carbon fiber, dry woven carbon fiber, boron fiber, ceramic-reinforced fibers, ceramic cloth, silicon carbide, and three-dimensional woven preforms made of carbon, boron, or ceramic fiber reinforcements.

13. The method of claim 11, further comprising shaping the fused part after cooling and while the fused part is still in the metallic sheath.

14. The method of claim 11, wherein applying the metallic sheath further comprises enclosing the bundle of MMC laminates or plies in the metallic sheath, evacuating atmosphere through an opening of the metallic sheath, and sealing the opening of the metallic sheath prior to heating the bundle of MMC laminates or plies.

15. The method of claim 11, wherein the curing or fusing temperature is in a range of 2000 degrees Fahrenheit to 2300 degrees Fahrenheit and the metallic sheath has a melting point of at least 2500 degrees Fahrenheit.

16. A method of manufacturing metal matrix composite parts, the method comprising:

removing surface contamination from dry reinforcement fibers;

creating a plurality of individual metal matrix composite (MMC) laminates by plating the dry reinforcement fibers with electroless nickel until the dry reinforcement fibers are fully encapsulated or fully wetted by the electroless nickel;

stacking each of the plurality of individual MMC laminates into a bundle of MMC laminates;

enclosing the bundle of MMC laminates within a metallic sheath, wherein the metallic sheath has a melting point of at least 2500 degrees Fahrenheit;

evacuating atmosphere through an opening of the metallic sheath via vacuum;

sealing the opening of the metallic sheath following the evacuating step;

heating the bundle of MMC laminates sealed in the metallic sheath at a curing or fusing temperature to consolidate the bundle of MMC laminates into a single fused part under pressure, wherein the curing or fusing temperature is in a range of temperatures from 2000 degrees Fahrenheit to 2300 degrees Fahrenheit;

shaping the bundle of MMC laminates in the metallic sheath; and cooling the fused part.

17. The method of claim 16, further comprising coating inside surfaces of the metallic sheath with a release agent to prevent bonding of the MMC laminates to the metallic sheath.

18. The method of claim 16, further comprising cutting open and removing the metallic sheath from the fused part after cooling.

* * * * *